United States Patent [19]
Wessel et al.

[11] 3,980,062
[45] Sept. 14, 1976

[54] FUEL INJECTION SYSTEM

[75] Inventors: Wolf Wessel, Schwieberdingen; Wilfried Sautter, Ditzingen; Jürgen Abt, Stuttgart; Dieter Handtmann, Sindelfingen, all of Germany

[73] Assignee: Robert Bosch G.m.b.H., Stuttgart, Germany

[22] Filed: Mar. 31, 1975

[21] Appl. No.: 563,334

[30] Foreign Application Priority Data
Apr. 25, 1974 Germany............................ 2420031

[52] U.S. Cl. .................. 123/32 EA; 123/139 E; 123/140 R
[51] Int. Cl.² ................ F02B 3/00; F02M 39/00
[58] Field of Search ........ 123/32 EA, 119 R, 139 E, 123/140 R

[56] References Cited
UNITED STATES PATENTS

| | | | |
|---|---|---|---|
| 3,713,427 | 6/1973 | Adler | 123/139 E |
| 3,716,035 | 2/1973 | Adler et al. | 123/139 E |
| 3,724,430 | 4/1973 | Adler | 123/119 R |
| 3,750,632 | 8/1973 | Zechnall | 123/32 EA |
| 3,796,197 | 3/1974 | Lochner | 123/139 E |

Primary Examiner—Charles J. Myhre
Assistant Examiner—Paul Devinsky
Attorney, Agent, or Firm—Edwin E. Greigg

[57] ABSTRACT

A fuel injection system for an internal combustion engine whose air induction tube contains an air flow rate measuring member with non-linear operating characteristics, coupled to a potentiometric transducer which produces the electric command variable for a follower control loop. A control amplifier drives a servomotor which sets the metering slide of a fuel metering valve assembly. The servomotor shaft is coupled to a second potentiometric transducer whose output is compared with the command variable in a bridge circuit connected to the input of the control amplifier. The mechanical link between the servomotor and the fuel metering slide has a non-linearity similar to that of the air flow rate measuring member.

13 Claims, 5 Drawing Figures

FUEL INJECTION SYSTEM

BACKGROUND OF THE INVENTION

The invention relates to a fuel injection system for mixture-compressing, externally ignited internal combustion engines employing continuous fuel injection into the induction tube. The induction tube includes an air flow rate measuring member and, seriatim, an arbitrarily actuated throttle valve. The air flow rate meter provides the command variable for a follower control loop. The follower control loop includes an electric control amplifier which sets an electromagnetic servomotor that actuates a control slide in a fuel metering valve within the fuel line for the purpose of metering out a fuel quantity in proportion to the air quantity aspirated by the engine.

It is the purpose of fuel injection systems of this type to create automatically a favorable fuel air mixture for all operational conditions of the internal combustion engine, so as to achieve nearly complete fuel combustion and thus to prevent, or at least to reduce sharply, the generation of toxic constituents in the exhaust gas while maintaining the highest possible power or the least fuel consumption of the engine.

In a known fuel injection system of this type, the air flow rate measurement is substantially linear as are the electrical transfer characteristics, resulting in the disadvantage of a low sensitivity of the fuel injection system to changes in the air flow rate in the induction tube during partial load operation of the internal combustion engine.

OBJECT AND SUMMARY OF THE INVENTION

It is a principal object of the invention to provide a fuel injection system of the type described above which meets the requirements made on such a system in service and which guarantees a high response sensitivity to changes of the operational conditions for all operational domains of the engine.

This object is obtained, according to the invention, by providing an air flow rate measuring member that has a non-linear characteristic, especially a logarithmic characteristic, and by providing that the command variable produced by the air flow rate measuring member is transmitted by a linearly acting transducer into the also linearly operating follower control loop. The invention further provides that the transfer function which modifies the correction variable between the electromagnetic servomotor and the control slide of the fuel metering valve is approximately the same function as the characteristic curve of the air flow rate measuring member.

A fuel injection system which is built according to the invention has the advantage that the non-linear relation between the aspirated air quantity and the position of the air flow rate measuring member expands the region of low partial engine load by comparison with the region of which partial engine load and full engine load. This expansion results in an increase of the response sensitivity of the system under conditions of reduced air flow rates as opposed to conditions of high air flow rates in the induction tube. A further advantage derives from the fact that the follower control loop operates in a linear manner, and this leads to an optimum control behavior so that even rapid transitions are possible without the excitation of self-oscillation. Providing a logarithmic characteristic for the air flow rate measuring member brings the further advantage that any correction voltage provided additively to the input of the control amplifier will have a multiplicative effect on the metered out fuel quantity.

In a preferred feature of the invention it is provided that the correction parameter is transmitted from the electromagnetic servomotor to the control slide of the fuel metering valve by a cam-plate which is embodied as an eccentric on which a ball bearing is mounted.

By using an eccentric for transmitting the correction variable to the control slide of the fuel metering valve one obtains the advantage that the transfer function is similar to a logarithmic function when the rotational angle $\alpha_1$ varies from 0 to 90°.

A further preferred and advantageous feature of the invention provides that the control slide of the fuel metering valve and the central shaft of the eccentric are positively coupled by a spring clamp. A connection of this kind permits the full utilization of the range of the electromagnetic servomotor in both directions of rotation for moving the control slide.

A further advantageous feature of the invention provides that measured values of engine parameters are sensed by potentiometric transducers and are fed as command variables to the follower control loop. The magnitude of the controlled variable is measured from the position of the servomotor and may be transformed by a potentiometric transducer into an electric parameter so as to be readily comparable with the magnitude of the command variable.

A further advantageous feature of the invention provides that the control amplifier has the characteristic of a proportional-integral controller with differential action (PID Controller), and that the comparison of the command variable with the controlled variable takes place at the input of the control amplifier at the junction point of an electrical bridge circuit, each of whose branches includes a resistor and a potentiometer. The potentiometers are connected in mutually opposite electrical sense with the two terminals of the source of electric potential. One of the linear potentiometers is actuated by the air flow rate measuring member and the other, non-linear, potentiometer is actuated by the servomotor. The summation, or junction point of the electrical bridge circuit is connected to the inverting input of an operational amplifier which is part of the control amplifier and whose non-inverting input is provided with one half of the battery voltage UB/2.

The above described comparator circuit offers the advantage that both potentiometers are provided with the full supply voltage and a supplementary source of potential, such as would be needed in known comparator circuits, can be dispensed with, thus increasing the precision of the control process. The use of potentiometers as measuring transducers permits making the input signals dependent on the ratios of resistances and hence makes them independent of any fluctuations in the supply voltage and of aging effects.

Another advantageous feature of the invention provides the control amplifier with a power amplifier which receives the output of the operational amplifier and consists of two identical power amplifier stages operating in push-pull operation. An inverting amplifier is connected ahead of the second power stage and each of the outputs of the two power stages is connected through a resistor with the same inverting input of the inverting amplifier. The non-inverting input of the inverting amplifier is provided with one-half the battery voltage UB/2 and its output is connected to the input of the second power stage, as has already been mentioned above.

Yet another advantageous feature of the invention provides that the output of the operational amplifier is connected to each base of two complementary transistors within the first power stage. The emitters of these two transmitters are connected together and are also connected to the mid-point of a resistive voltage divider connected between the terminals of the battery. The collector of each transistor is connected to the base of a second complementary transistor and the collectors of these second complementary transistors are connected together to form the output of the first power stage. The emitter of one of the second complementary transistors is connected to the positive battery terminal and the emitter of the other second complementary transistor is connected to the negative terminal. The armature of the electromagnetic servomotor is connected between the respective outputs of the two power stages of the power amplifier. The particular construction of the power amplifier according to the invention makes available the entire voltage range of the supply voltage for turning the armature of the electromagnetic servomotor in both directions of rotation.

The invention will be better understood as well as further objects and advantages will become more apparent, from the ensuing detailed specification of an exemplary embodiment taken in conjunction with the drawing.

DESCRIPTION OF THE PREFERRED EMBODIMENT

Figure 1:
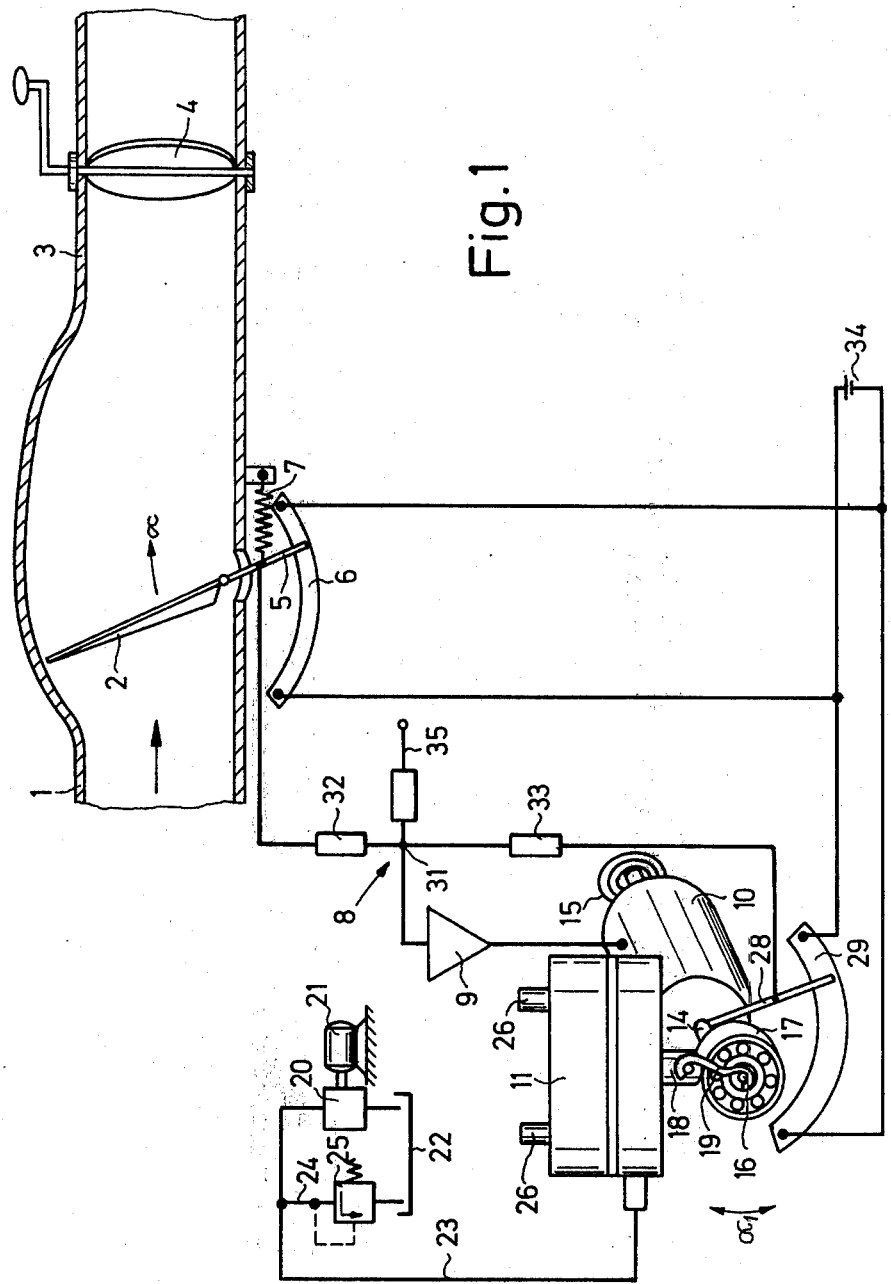
FIG. 1 is a partially sectional and partially front elevational view of a fuel injection system according to the invention.

Turning now to the drawings, FIG. 1 shows a fuel injection system to the invention in which the air necessary for combustion flows in the direction of the arrow through an induction tube region 1 containing an air flow rate measuring member 2 and further flows through an induction tube region 3, containing an arbitrarily actuatable throttle valve 4 and continues to flow to one or several cylinders (not shown) of an internal combustion engine. The air flow rate measuring member comprises an air baffle, denoted as 2, pivotably attached to one side of the induction tube, which actuates the wiper 5 of a potentiometer 6 serving as measuring transducer and it is pivotable in opposition to the force of a weak restoring spring 7. Other known electronic air quantity measuring instruments may serve as the air flow rate measuring member.

According to the invention, the air flow rate measuring member 2 obeys a non-linear, particularly a logarithmic characteristic curve, i.e. the functional relationship between the aspirated air quantity and the angle of rotation $\alpha$ of the air flow rate measuring member is non-linear. The command variable, defined by the position of the air flow rate measuring member 2, is fed by the linear potentiometer 6 into the follower control loop 8 which contains a control amplifier 9 that sets an electromagnetic servomotor 10, which, in turn, actuates a fuel metering valve 11.

The electromagnetic servomotor 10 has a shaft 14, which rotates in opposition to the force of a torsional spring 15. Mounted on the shaft 14 is an eccentric with a central shaft 16, carrying a ball bearing 17. The correction variable is transmitted by the eccentric and its ball bearing 17 from the servomotor 10 to the control slide 18 of the fuel metering valve 11. The metering valve 11 meters out a fuel quantity which is intended to be proportional to the aspirated air quantity. The eccentric central shaft 16 and the control slide 18 are positively coupled by a spring clamp 19. Fuel is supplied to the fuel metering valve 11 by a fuel pump 20, driven by an electric motor 21. The pump delivers fuel from a fuel container 22, through a line 23, to the fuel metering valve 11. Branching off from the line 23 is a line 24 containing a pressure limiting valve 25 which permits fuel to flow back into the fuel container 22 when the fuel system pressure becomes excessive. The metered out fuel flows through line 26 to the fuel injection valves (not shown) which are disposed within the induction tube in the immediate vicinity of the cylinders of the internal combustion engine.

Coupled to the shaft to the electromagnetic servomotor 10 is the wiper 28 of a non-linear potentiometer 29 which delivers the magnitude of the controlled variable to the follower control loop 8. The magnitude of the command variable and that of the controlled variable are compared at the input of the control amplifier 9 at a summation point 31 of an electrical bridge circuit which includes the potentiometers 6 and 29 and resistors 32 and 33. The voltage source of a vehicle battery 34. It is possible to perform multiplicative adjustments in the metered out fuel quantity by supplying additive voltages to the summation point 31 via corrective lines 35.

The fuel injection system depicted in FIG. 1 functions as follows:

When the internal combustion engine is running, air is aspirated through the induction tube 1, 3. As a result, the air flow rate measuring member 2 deflects through an angle $\alpha$ from its normal, quiescent position. The characteristic curve of the air flow rate measuring member 2 is non-linear, especially logarithmic, as may be seen in the curve shown in the first quadrant of the diagram of FIG. 2. $Q_L$ is the air quantity aspirated by the internal combustion engine per unit time i.e. the air flow rate. The shown non-linear behavior offers the advantage that, in the region of low partial load of the internal combustion engine, the motion of the air flow rate meter 2 is expanded when compared to its motion in the region of high partial load and of full load and thus an improved response sensitivity is attained.

The deflection motion of the air flow rate measuring member 2 moves the wiper 5 of the linear potentiometer 6 which serves as a measuring transducer and delivers the command variable to the follower control loop 8. The characteristics of the follower control loop are approximately linear, so that optimum control behavior is obtained, permitting rapid transitions without excitation of self-oscillations. The follower control loop contains a control amplifier which has the time characteristics of a proportional-integral controller with differential action (PID Controller). The output signal delivered by the control amplifier 9 actuates the electromagnetic servomotor 10 whose shaft 14 carries an eccentric and, mounted thereon, a ball bearing 17. The control slide 18 of the fuel metering valve 11 is connected to the center pin of the eccentric in a positive manner by a spring clamp 19, so that a hysteresis-free motion of the control slide is guaranteed in both directions of rotation of the electromagnetic servomotor. If the fuel injection system is not in service, the shaft 14 and the armature of the electromagnetic servomotor 10 are returned to their quiescent position by torsional spring 15, which simultaneously moves the control slide 18 into a position in which fuel flow through the fuel line is interrupted.

The transfer function $H = r(1 - \cos\alpha_1)$ which describes the relation between the mechanical motions of the electromagnetic servomotor 10 and the control slide 18 of the fuel metering valve 11, is approximately similar, in the region $0° \leq \alpha_1 \leq 90°$, to the logarithmic characteristic function obeyed by the air flow rate measuring member 2. H describes the stroke of the control slide 18, $r$ is the eccentricity of the eccentric and $\alpha_1$ designates the rotational angle of shaft 14 of the servomotor 10. The transfer function H is shown in the 4th quadrant of diagram of FIG. 2.

Figure 2:
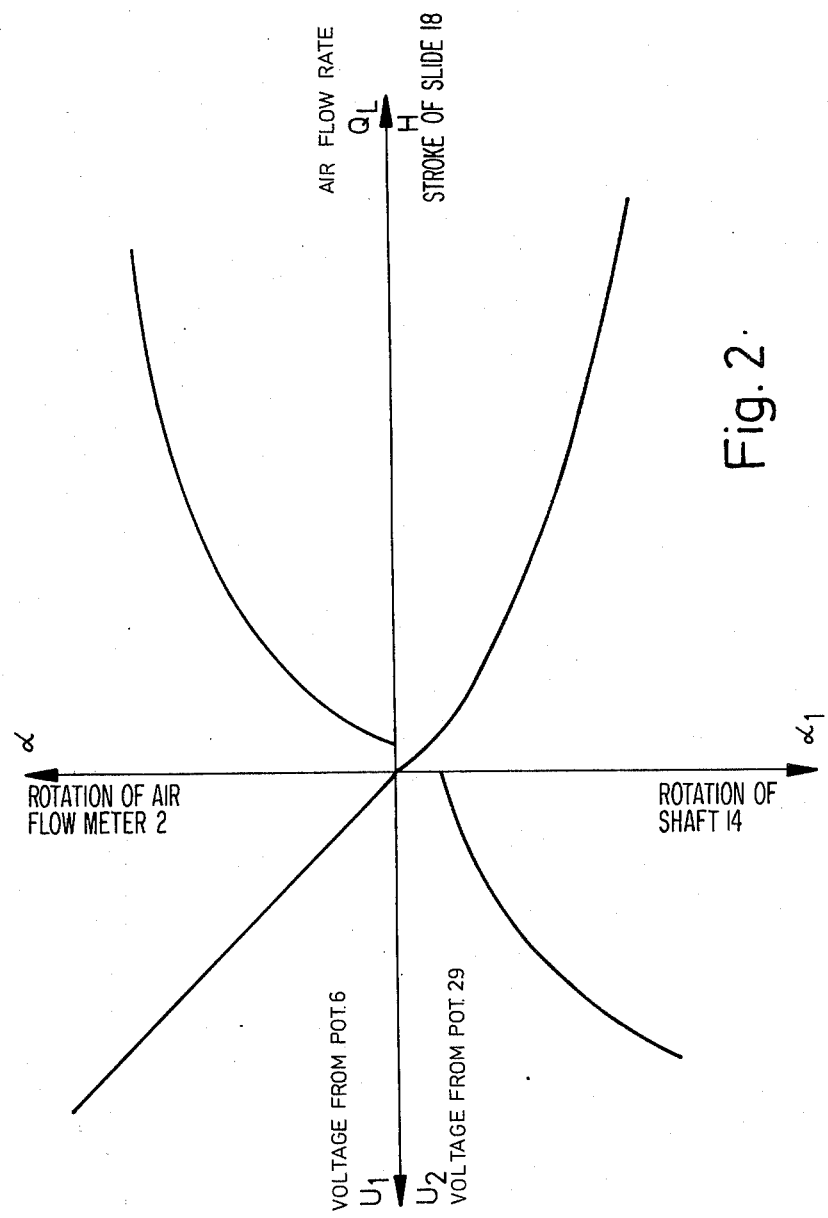
FIG. 2 is a diagram of the characteristic behavior curves of the air flow rate measuring member (1st quadrant) and of the transfer function of the correction variable between the electromagnetic servomotor and the control slide of the fuel metering valve (4th quadrant). The diagram also shows the output voltage as a function of angular rotation for the potentiometer which serves as measuring transducer for the air flow rate measuring member (2nd quadrant) and for the potentiometer coupled to the electromagnetic servomotor (3rd quadrant).

Rotating with the shaft of the servomotor 10 is the wiper 28 of a non-linear potentiometer 29. The non-linear behavior of this potentiometer 29 permits the compensation for the minor deviation of the transfer function H, as between the servomotor 10 and the control slide 18, compared with the characteristic curve of the air flow rate measuring member 2. The second quadrant of FIG. 2 contains a diagram of the characteristic curve of the linear potentiometer 6, showing the behavior of its output voltage $U_1$ as a function of the deflection angle $\alpha$ of the air flow rate measuring member 2. The third quadrant of the diagram of the FIG. 2 shows the characteristic curve of the non-linear potentiometer 29 and the behavior of the output voltage U2 as a function of the angular rotation $\alpha_1$ of the servomotor shaft 14. The adaptation of the transfer function H, as between the servomotor and the control slide 18, to the characteristic curve of the air flow rate measuring member 2 guarantees the proportionality as between the aspirated air quantity and the metered out fuel quantity. The magnitude of the controlled variable supplied by the potentiometer 29, (see FIG. 3) which serves as a measuring transducer, is compared, at the input of the control amplifier 9 in a summing point 31 of the electrical bridge circuit, with the command variable supplied by the potentiometer 6. It is possible to make multiplicative adjustments or corrections of the metered out fuel quantity, for example in dependence on the engine temperature, by applying additive voltages to the summing point 31.

Figure 3:
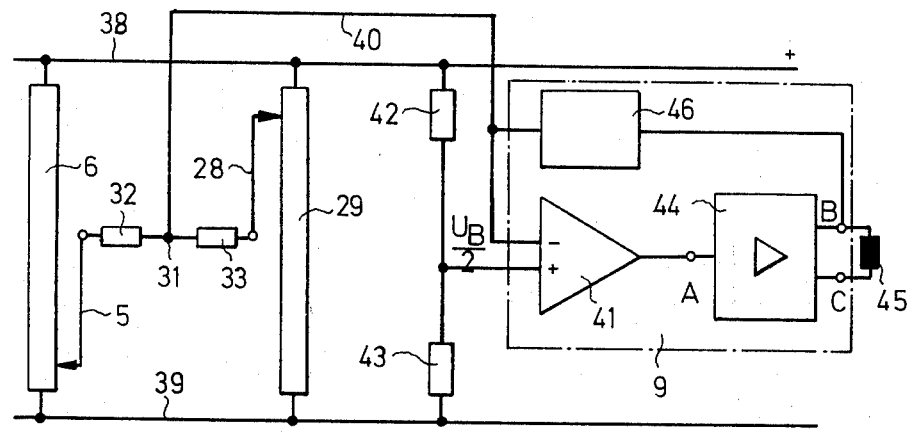
FIG. 3 is a schematic diagram of a comparator circuit used in the apparatus of FIG. 1.

The bridge circuit also shown in FIG. 3 depicts the potentiometers 6 and 29 delivering the command variable and the controlled variable respectively, connected in the opposite electrical sense through lines 38 and 39 to the voltage source 34. The summing point 31 of the bridge circuit is connected by a line 40 with the inverting input of an operational amplifier 41, whose non-inverting input lies at one-half the battery voltage UB/2 due to being connected to the mid-point of a voltage divider comprising equal resistors 42 and 43, connected to the positive and negative terminals of the battery, respectively. Applying the full voltage of the voltage source 34 to both potentiometers 6 and 29 offers the advantage of an increased precision of the control loop. The output A of the operational amplifier 41 is supplied to the input of a power amplifier 44, whose outputs B and C are connected across the armature 45 of the servomotor 10. A feedback network 46 is connected between the output B of the power amplifier 44 and the inverting input of the operational amplifier 41.

Figure 4:
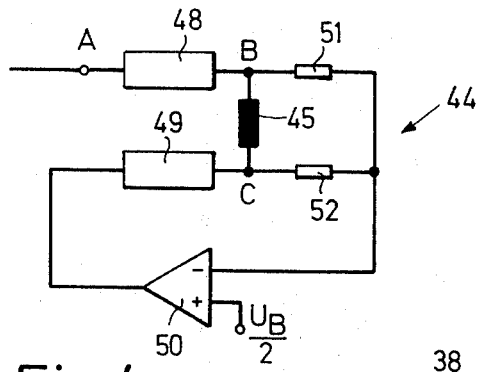
FIG. 4 is a circuit diagram of an exemplary embodiment of the power amplifier within the control amplifier of the apparatus.

FIG. 4 shows a schematic diagram of the power amplifier 44 which is part of the control amplifier 9, and which receives the output of the operational amplifier 41. The power amplifier 44 consists of two identical power stages, 48 and 49, configured for push-pull operation, and at inverting amplifier 50 is connected ahead of the second power stage 49. The output B of the first power stage 48 is connected to the inverting input of the inverting amplifier 50 through a resistor 51, and the output C of the second power stage 49 is connected to the same inverting input of the inverting amplifier 50 through a resistor 52. The non-inverting input of the inverting amplifier 50 is supplied with one-half the battery voltage UB/2. The output of the inverting amplifier 50 is connected to the input of the second power stage 49.

Figure 5:
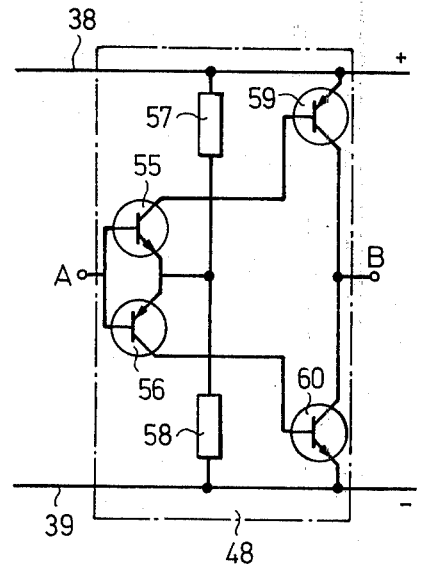
FIG. 5 is a schematic diagram of the first power stage of the power amplifier of FIG. 4.

FIG. 5 is a circuit diagram of the first power stage 48 of FIG. 4 and it may be seen that the output A of the operational amplifier 41 is connected to the base of each of two complementary transistors 55 and 56 whose emitters are joined together and are connected to the mid-point of a voltage divider network consisting of equal resistors 57 and 58 connected between the terminals 38, 39 of the voltage source 34. The collector of each of the complementary transistors 55, 56 is connected to the base of a second complementary transistor 59 and 60, respectively, whose own collectors are jointly connected to the output B of the first power stage 48. The emitter of one of the second transistors 59 is connected to the positive terminal 38 and the emitter of the other second transistor 60 is connected to the negative terminal 39 of the voltage source 34. The second power stage 49 in FIG. 4 is identical to the first power stage 48, but it operates in the inverse sense from the first power stage 48. Thus, for example, if the voltage at point A drops, the PNP transistor 56 starts to conduct and the voltage at the point B drops below the level of one-half the battery voltage UB/2. In order to restore the equalized conditions, the inverting amplifier must so influence an appropriate transistor of the second power stage 49 that the output C lies at exactly the same voltage difference above one-half the battery voltage UB/2. In this way, the full voltage range UB of the battery, or appropriate portions thereof, is available in both directions of rotation for setting the armature 45 of the servomotor 10.

Preferably, the servomotor 10 may be embodied as a motor without a commutator since it is only required to rotate through angles which are always less than approximately 90°.

That which is claimed is:

1. In a fuel innjection system for an internal combustion engine which includes an electric battery and an air induction tube containing, seriatim, an air flow rate measuring member and a throttle valve, said system also including
   A. first measuring transducer means associated with said air flow member and producing a first electrical signal;
   B. control amplifier means, connected to said first measuring transducer and receiving said first electrical signal;
   C. electromagnetic servomotor means, including an armature, and controlled by said control amplifier means, said electromagnetic servomotor means having a rotating shaft means;
   D. fuel control means, including a fuel control slide for providing fuel to the engine;
   E. linkage means, for transmitting and setting motions of said servomotor shaft means to said fuel control means;
   F. second measuring transducer means coupled with said shaft means for providing a second electrical signal representative of the position of said rotating shaft to said control amplifier means, the improvement comprising:
   G. circuit means mediately supplying said first and second signals to said control amplifier means constituting a feedback control loop wherein said airflow rate measuring member and said linkage means have substantially identical non-linear operating characteristics.

2. An improved fuel injection system as defined in claim 1, wherein said linkage means includes a cam-plate mounted on the rotating shaft means of said servomotor means for moving said fuel control slide.

3. A fuel injection system as defined in claim 2, wherein said cam-plate includes an eccentric on which is mounted a ball bearing.

4. A fuel injection system as defined in claim 3, wherein said linkage means includes a spring clamp for coupling together said eccentric and said fuel control slide.

5. A fuel injection system as defined in claim 1, wherein said control amplifier means is a proportional-integral controller with differential action (PID Controller).

6. A fuel injection system as defined in claim 5, wherein said electrical comparator means includes at least two branches joined in a summing junction, each said branch containing, in series, a fixed resistor and one of said first and second potentiometric transducer means.

7. A fuel injection system as defined in claim 6, wherein said control amplifier means includes an operational amplifier whose inverting input is connected to said summing junction of said comparator means and whose non-inverting input is provided with a voltage equal to one-half of the nominal voltage of said electric battery.

8. A fuel injection system as defined in claim 7, wherein said control amplifier means further includes power amplifier means connected to the output of said operational amplifier and comprising identical first and second power stages, working in push-pull operation, and an inverting amplifier, connected ahead of said second power stage.

9. A fuel injection system as defined in claim 8, wherein the output terminal of each of said power stages is connected, through a resistor, to the inverting input of said inverting amplifier and wherein the non-inverting input of said inverting amplifier is provided with one-half the nominal voltage of said electric battery.

10. A fuel injection system as defined in claim 9, wherein the output of said inverting amplifier is connected to the input of said second power stage.

11. A fuel control as defined in claim 12, wherein said first power stage includes:
    A. two first complementary transistors whose bases are joined together and are connected to the output of said operational amplifier, and whose emitters are joined together and to the midpoint of a resistive voltage divider connected between the opposite terminals of said electric battery, and each of whose collectors is connected to the base of one of two second complementary transistors whose collectors are joined together and form the output of said first power stage, while the emitters of said second complementary transistor are connected to opposite terminals of said electric battery.

12. A fuel injection system as defined in claim 11, wherein the armature of said servomotor means is connected between the outputs of said first and second power stages of said power amplifier means.

13. A fuel injection system as defined in claim 12, wherein said servomotor is embodied without a commutator.

* * * * *